3,808,290
SYNTHETIC LEATHER FROM POLYGLUTAMIC ACID-ESTERS AND ACIDIC AMINO ACID ESTERS

Yasuo Fujimoto, Machida, Koichi Nagaoka, Tokyo, Keizo Tatsukawa, Machida, and Yoichi Koiwa, Tokyo, Japan, assignors to Kyowa Hakko Kogyo Co., Ltd., Tokyo, Japan
No Drawing. Continuation-in-part of abandoned application Ser. No. 761,853, Sept. 23, 1968. This application Nov. 22, 1971, Ser. No. 201,148
Claims priority, application Japan, Oct. 20, 1967, 42/67,192
Int. Cl. C08g 20/08
U.S. Cl. 260—857 TW         31 Claims

ABSTRACT OF THE DISCLOSURE

Synthetic leather-like coating composition containing polyglutamic acid-γ-ester and acidic amino acid derivative. The amino acid derivative is alkyl or aralkyl or aryl esters of, for example, amino maleic acid, aspartic acid, glutamic acid, α-aminosuberic, α-aminosebacic acid, β-methylaspartic acid, β-hydroxyaspartic acid, β-alkoxyaspartic acid, β-hydroxyglutamic acid, and β-alkoxyglutamic acid. The composition is coated on or impregnated into a cloth substrate.

CROSS-REFERENCES TO RELATED APPLICATIONS

This is a continuation-in-part of our copending application Ser. No. 761,853 filed Sept. 23, 1968 now abandoned.

The present invention relates to a process for producing an improved synthetic leather in which polymer (homo- or copolymer or blend polymer) of glutamic acid-γ-ester or esters with or without other amino acids is used as the main constituent thereof. More particularly, the present invention is directed to an improved synthetic leather which exhibits substantially the same properties of, for example, tensile strength, elongation, etc., as those of natural leather.

As the conventional synthetic leather-like materials, it is well known to use such materials as so-called polyvinyl chloride leather, polyamide leather, polyurethane leather, and the like. These materials are prepared by respectively treating the substrate cloth with polyvinyl chloride, a polyamide, a polyurethane, and the like. However, these materials respectively have various defects when compared with natural leathers. Recently, polyamino acid leather having the properties resembling natural leathers in quality has also been developed. This polyamino acid leather is prepared according to the same process as in the production of the conventional synthetic leathers, wherein natural fibers, synthetic fibers, unwoven (nonwoven) fabrics or synthetic resin sheets are coated with film of polymer (homo- or copolymer or blend polymer) of glutamic acid-γ-ester or esters with or without other amino acids (hereinafter referred to merely as polyglutamic acid-γ-ester) formed thereon. The properties of synthetic leather thus obtained are mainly dominated by the properties of polyglutamic acid-γ-ester film formed on the surface thereof, though such properties of synthetic leather are often influenced by the kind of substrate cloths or materials employed. Comparing the properties of polyglutamic acid-γ-ester film with those of the silver surface of natural leather, there are substantial differences between the two in tensile strength and elongation, as shown in Table 1. Because of these differences, the polyamino acid leather cannot sufficiently provide the feeling, touching, appearance, body, substance and characteristics of natural leather.

TABLE 1
Comparison of silver surface of natural leather with film of polyglutamic acid-γ-methyl ester

|  | Silver surface of natural leather | Film of polyglutamic acid-γ-methyl ester |
|---|---|---|
| Tensile strength (kg./cm.²) | 120 | 300 |
| Elongation (percent) | 140 | 40 |

NOTE.—Rate of tension: 200 mm./min., tension test at 26° C.

Extensive studies have been made to find a method for making films having properties closely resembling those of natural leathers, thereby overcoming the above-mentioned drawbacks.

An object of the present invention is to avoid the prior art disadvantages in producing synthetic leathers.

Another object of the present invention is to provide an improved synthetic leather which contains many of the properties of natural leather, such as for example, a similar tensile strength and elongation.

A further object of the present invention is to provide an improved synthetic leather which very closely resembles natural leather in possessing such properties as an improved antistatic power, a reduction in dust adsorption, and the like.

Still another object of the present invention is to provide an improved synthetic leather wherein a substrate is coated with a film to produce a product which is leather-like in nature.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved film having properties which more closely resemble those of the silver surface of natural leather can be obtained by preparing films from a material obtained by adding acidic amino acid derivatives to polyglutamic acid-γ-esters. Generally the amount of acid derivative added is at least about 5 up to about 60% by weight of the polymer in the composition. Preferably from about 8 to 52% of the acid derivative is used based on the polymer content; from 8 to 40% being especially preferred. An illustration demonstrating an embodiment of the above finding is shown in Table 2.

Example 1 was repeated with the exception that the

TABLE 2
Properties of film obtained from a mixture of poly-γ-methyl glutamate and dibutyl glutamate ester

|  | Amount of dibutyl glutamate ester based on the content of the polymer to be mixed | | | |
|---|---|---|---|---|
|  | 0% | 10% | 26% | 52% |
| Tensile strength (kg./cm.²) | 302 | 180 | 120 | 90 |
| Elongation (percent) | 40 | 110 | 120 | 110 |

NOTE.—Rate of tension: 200 mm./min., tension test at 26° C.

It has been found that a synthetic leather prepared by forming this film on a cloth substrate shows improved properties which more closely resemble those of natural leather. Furthermore, a surprising fact found by the present inventors was the phenomenon that intrinsic volume resistivity of said film markedly decreases by the addition thereto of an acidic amino acid derivative, which has resulted in the present invention.

For example, poly-γ-methyl-L-glutamate film showed an intrinsic volume resistivity (voltage: 100 v.) of $4.86 \times 10^{10}/\Omega cm.$, whereas that of the film obtained from poly-γ-methyl-L-glutamate to which 10% of dibutyl glutamate ester has been added was found to be a value less than $10^9$. The above fact is considered to be ascribable to the synergistic action between said diester and polyglutamic acid-γ-ester simultaneous with the effect being obtained by the addition thereto of said diester. When the polyglutamic acid-γ-esters in which the acidic amino acid derivative has been added is used as films in the production of synthetic leathers, as mentioned above, they exhibit substantially improved properties due to the newly imparted antistatic power together with the aforesaid physical properties, whereby its adsorption of dust and the like from the air is substantially reduced.

Sheet-like articles good in quality can be obtained by impregnating or coating the substrates with an organic solvent solution prepared by thoroughly kneading an organic solvent solution of polyglutamic acid-γ-esters with an acidic amino acid derivative (or its organic solvent solution) and then air-drying, drying under heating, or coagulating the polymer by dipping the resultant product into a coagulating liquid containing water, lower alcohols, ketones, hydrocarbons or a mixture thereof. Of course, it is also possible that a known adhesive can be interposed between the substrate and a film formed by a mixture of polyglutamic acid ester and an acidic amino acid derivative to strengthen the adhesion thereof to the substrate.

As the substrate, there may be used a woven fabric or unwoven fabric composed of one, two or more members, for example synthetic fibers such as polyamides, polyesters, polyacrylonitrile, polyvinyl chloride, polyolefins, polyamino acids and glass fibers, regenerated fibers such as viscose fiber, acetate fiber and the like, natural fibers such as cotton, silk, wool, linen and collagen obtained by fraying natural leathers, or a sheet-like material constituted by one, two or more members, for example, synthetic resins such as polyamides, polyesters, polyacrylonitrile, polyvinyl chloride, polyolefins and polyamino acids, natural leathers from which silver surfaces have been removed, collagen obtained from waste leathers, natural rubber and synthetic rubber.

As the organic solvent, there may be used conventional solvents, e.g. halogenated hydrocarbons, such as ethylene dichloride, trichloroethane, tetrachloroethane and methylene chloride, alkyl esters of alkanoic acid, dimethyl sulfoxide, dimethyl formamide, dioxane, and the like which are capable of dissolving polyglutamic acid-γ-esters.

As the polyglutamic acid-γ-esters, there may be used those of the poly-L-glutamic acid series or the poly-D-glutamic acid series or a mixture of such polymers. Although the homo- or copolymers or blend polymers (polyamides) of the glutamic acid-γ-ester monomers given in the following formulas with or without other amino acid or acids or derivatives thereof;

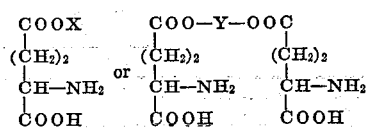

including those which are either optically active or optically inactive can be used as the film or adherent according to the present invention, it is more desirable to use the homo- or copolymers or blend polymers of glutamic acid-γ-ester or γ-esters having X or Y group selected from the following residues or groups with or without other amino acid or acids: a mono- or di-valent hydrocarbon residue consisting of a saturated or unsaturated aliphatic hydrocarbon residue having 1 to 6 carbon atoms, a saturated or unsaturated cycloaliphatic hydrocarbon residue having 4 to 8 carbon atoms, an aromatic hydrocarbon residue having 6 to 10 carbon atoms including aryl, arylene, alkaryl, alkarylene, aralkyl, aralkenyl, aralkylene, and aralkenylene type, and a residue belonging in the above-mentioned type of hydrocarbon having a substituent or substituents selected from the group consisting of chloro, bromo, alkoxy, and carboalkoxy.

Typical of ester groups represented by X are the same as those for $R_1$ described later, and those for Y are ethylene, propylene, butylene, trimethylene, tetramethylene, pentamethylene, hexamethylene, 2-butenylene, cyclopentylene, cyclohexylene, cyclohexenylene, p-phenylene, and residues derived from p-di(hydroxymethyl)-benzene, p-di(hydroxymethyl)-cyclohexane, diethylene glycol, dipropylene glycol.

Typical examples of polymers are: homopolymer such as poly-γ-methyl glutamate, poly-γ-ethyl glutamate, poly-γ-(i-propyl) glutamate, poly-γ-(n-propyl) glutamate, poly-γ-(n-butyl) glutamate, poly-γ-(t-, sec- or i-butyl) glutamate, poly-γ-benzyl glutamate, polyamide polymer of $O^1$, $O^2$-di(γ-glutamyl) ethylene glycol and polyamide polymer of $O^1,O^3$-di(γ-glutamyl) trimethylene glycol; copolymer such as copoly(γ-methyl glutamate, γ-ethyl glutamate), copoly[γ-methyl glutamate, γ-(n-propyl) glutamate], copoly[γ-methyl glutamate, γ-(-ipropyl) glutamate], copoly [γ-methyl glutamate, γ-(n-butyl) glutamate], copoly(γ-methyl glutamate, γ-benzyl glutamate), copoly(γ-methyl glutamate], copoly[γ-methyl glutamate, γ-ethyl glutamate, lysine), copoly(γ-methyl glutamate, methionine), copoly[γ-methyl glutamate, γ-ethyl glutamate, γ-(n-propyl) glutamate], copoly[γ-methyl glutamate, γ-ethyl glutamate, γ-(i-propyl) glutamate], copoly[γ-methyl glutamate, $O^1$, $O^2$-di(γ-glutamyl) ethylene glycol, γ-(i-propyl) glutamate], copoly(γ-methyl glutamate, γ-ethyl glutamate, γ-butyl glutamate), and copoly(γ-methyl glutamate, alanine, methionine), blend polymer such as blend polymer of poly-γ-methyl glutamate and poly-γ-ethyl glutamate, of poly-γ-methyl glutamate and poly-γ-(n-propyl) glutamate, of poly-γ-methyl glutamate and poly-γ-(i-propyl) glutamate, of poly-γ-methyl glutamate and poly-γ-(n-butyl) glutamate, of poly-γ-methyl glutamate, poly-γ-ethyl glutamate and poly-γ-(n-butyl) glutamate, of poly-γ-methyl glutamate and poly-γ-benzyl glutamate, of poly-γ-methyl glutamate and polyalanine, of poly-γ-methyl glutamate, poly-γ- ethyl glutamate and polyalanine, of poly-γ-methyl glutamate and poly-$N^\epsilon$-acetyllysine, of poly-γ-methyl glutamate and polymethionine, of poly-γ-methyl glutamate, polyalanine and polymethionine, of poly-γ-ethyl glutamate and poly-γ-(n-butyl) glutamate, of poly-γ-ethyl glutamate and poly-γ-(n-propyl) glutamate, of poly-γ-ethyl glutamate and poly-γ-(i-propyl) glutamate, of poly-γ-ethyl glutamate and polyalanine, of poly-γ-ethyl glutamate and poly-$N^\epsilon$-acetyllysine, of poly-γ-ethyl glutamate and polymethionine, of poly-γ-methyl glutamate, polyamide polymer of $O^1,O^2$-di(γ-glutamyl) ethylene glycol and polyalanine, of poly-γ-methyl glutamate, polyamide polymer of $O^1,O^3$-di (γ-glutamyl) trimethylene glycol and poly-γ-butyl glutamate, and blend polymer of poly-γ-methyl glutamate, polyalanine and polymethionine. In general, these polymers have molecular weights ranging from about 50,000 to 500,-000 or more, preferably from about 100,000 to about 500,-000.

The acidic amino acid derivatives to be used in the process of the present invention are compounds represented by the general formulas:

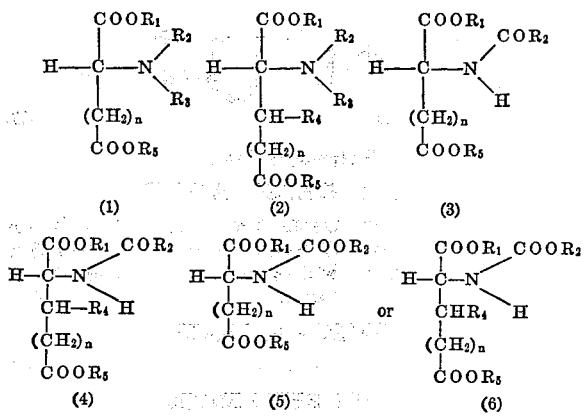

wherein, $R_1$ and $R_5$ are the same or different monovalent groups or ester residues selected from the group consisting of a saturated or unsaturated aliphatic hydrocarbon residue having 1 to 10 carbons, a saturated or unsaturated cycloalipahtic hydrocarbon residue having 4 to 8 carbons, an aromatic hydrocarbon residue including aryl, alkaryl and aralkyl type having 6 to 10 carbons, and a residue belonging in the above-mentioned types of hydrocarbon residue or hydrocarbyl groups having a substituent or substituents selected from the group consisting of chloro and bromo; $R_2$ and $R_3$ are the same or different and respectively represent a hydrogen or a hydrocarbon residue selected from the group consisting of a saturated or unsaturated aliphatic hydrocarbon residue having 1 to 6 carbon atoms, a saturated or unsaturated cycloaliphatic hydrocarbon residue having 4 to 6 carbons, an aromatic hydrocrbon residue including aryl, alkaryl and aralkyl type having 6 to 8 carbon atoms, and a residue belonging to the above-mentioned types of hydrocarbon residue having a substituent or substituents selected from the group consisting of chloro and bromo; $R_4$ represents an OH, an alkoxy, or an aliphatic hydrocarbon residue selected from the group consisting of a saturated or unsaturated aliphatic hydrocarbon residue having 1 to 6 carbon atoms, and $n$ is an integer from 0 to 30.

Typical substituents of the ester of N-substituted or N,N-disubstituted compounds of the aforesaid acidic amino acid are formyl, acetyl, propionyl, butyryl, valeryl, dodecanoyl (lauroyl), palmitoyl, stearoyl, benzoyl, phenylacetyl, carbobenzoxy (benzyloxycarbonyl), chloroacetyl, dichloroacetyl, monobromoacetyl, trichloroacetyl, carbocyclohexyloxy (cyclohexyloxycarbonyl), carbo-tert-butyloxy (tert-butyloxycarbonyl), methyl, ethyl, n-propyl and isomers thereof, n-butyl and isomers thereof, n-pentyl and isomers thereof; n-hexyl and isomers thereof, n-octyl and isomers thereof, n-decyl and isomers thereof, n-dodecyl and isomers thereof, hexadecyl (cetyl), stearyl, oleyl, cyclobutyl, cyclopentyl, cyclohexyl, cycloheptyl, cyclooctyl, cyclobutyl methyl, cyclopentylmethyl, cylohexylmethyl, phenyl, benzyl, o-tolyl, β-phenylethyl, p-tolylmethyl, p-chlorobenzyl, p-nitrobenzyl, p-cyanobenzyl, p-methoxybenzyl, p-ethoxybenzyl, pentachlorobenzyl, p-chlorophenyl, pentachlorophenyl, p-nitrophenyl, o-(2-chlorotolyl), methoxymethyl, ethoxymethyl, 2-hydroxyethyl, 2-nitroethyl, 2-cyanoethyl, 2-methoxyethyl, 2-bromoethyl, 1, 2-dichloropropyl, 2,3-dichloropropyl, 2-chloropropyl, 2-chloroethyl, vinyl, crotyl, and allyl.

Typical groups of the ester group represented by the $R_1$ and $R_5$ are: methyl, ethyl, n-propyl, i-propyl, n-butyl and isomers thereof, n-pentyl and isomers thereof, n-hexyl and isomers thereof, n-heptyl and isomers thereof, cyclobutyl, cyclopentyl, cyclohexyl, cycloheptyl, cyclooctyl, phenyl, o-tolyl, p-tolyl, benzyl, β-phenylethyl, p-tolylmethyl, o-tolylmethyl, o-(2-chlorotolyl), methoxymethyl, ethoxymethyl, 2-chloroethyl, 2-bromoethyl, 2-chloropropyl, and 3-chloropropyl.

Representative compounds to be used include diesters and mixed esters of acidic amino acids, β - substituted acidic amino acids, N-substituted acidic acids, N,N-disubstituted acidic amino acids, β-substituted N-substituted acidic amino acids and β-substituted N,N-disubstituted acidic amino acids wherein the said acidic amino acids are such as, for example, aminomalonic acid, aspartic acid, glutamic acid, α-aminoadipic acid, α-aminopimelic acid, α-aminosuberic acid, α-aminosebacic acid, and the like, the substituents on the β-position are hydroxy, methoxy, ethoxy, n-propoxy, n-butoxy, i-propoxy, i-butoxy, sec-butoxy, tert-butoxy, methyl, ethyl, n-propyl, i-propyl, n-butyl, i-butyl, sec-butyl, and t-butyl, the substituents on the N-position are formyl, acetyl, propionyl, butyryl, valeryl, dodecanoyl (lauroyl), palmitoyl, stearoyl, benzoyl, phenylacetyl, carbobenzoxy (benzyloxycarbonyl), chloroacetyl, dichloroacetyl, trichloroacetyl, carbocyclohexyloxy (cyclohexyloxycarbonyl), carbo - tert-butyloxy (tert-butyloxycarbonyl), methyl, ethyl, n-propyl and isomers thereof, n-butyl and isomers thereof, n-pentyl and isomers thereof, n-hexyl and isomers thereof, n-octyl and isomers thereof, n-decyl and isomers thereof, n-dodecyl and isomers thereof, hexadecyl (cetyl), stearyl, oleyl, cyclobutyl, cyclopentyl, cyclohexyl, cycloheptyl, cyclooctyl, cyclobutylmethyl, cyclopentylmethyl, cyclohexylmethyl, phenyl, benzyl, o-tolyl, β-phenylethyl, p-tolylmethyl, p-chlorobenzyl, p-nitrobenzyl, p-cyanobenzyl, p-methoxybenzyl, p - ethoxybenzyl, pentachlorobenzyl, p-chlorophenyl, pentachlorophenyl, p-nitrophenyl, o-(2-chlorotolyl), methoxymethyl, ethoxymethyl, 2-hydroxyethyl, 2-nitroethyl, 2 - cyanoethyl, 2 - methoxyethyl, 2-bromoethyl, 1,2 - dichloropropyl, 2,3 - dichloropropyl, 2-chloropropyl, 3-chloropropyl, 2-chloroethyl, vinyl, crotyl, and allyl, and the ester groups are methyl, ethyl, n-propyl, i-propyl, n-butyl and isomers thereof, n-pentyl and isomers thereof, n-hexyl and isomers thereof, n-heptyl and isomers thereof, phenyl, o-tolyl, p-tolyl, benzyl, β-phenylethyl, p-tolylmethyl, o-tolylmethyl, o-(2-chlorotolyl), methoxymethyl, ethoxymethyl, 2-chloroethyl, 2-bromoethyl, 2-chloropropyl and 3-chloropropyl. These derivatives to be used may be either optically active or inactive.

The following examples are given as merely being illustrative of the present invention, and accordingly, should not be considered as limiting.

Example 1

A viscous liquid obtained by thoroughly kneading a mixture comprising 92 parts of poly-γ-methyl-L-glutamate (molecular weight: about 400,000), 8 parts of bibutyl glutamate ester and 900 parts of 1,2-dichloroethane is coated so as to form a layer of 0.3 mm. in thickness on a polyester fiber substrate cloth of 0.5 mm. in thickness. The coated product is then heated at 50°–60° C. to evaporate the solvent, thereby producing a sheet-like article. The thus obtained sheet-like article very closely resembles natural leather in both tensile strength and elongation and looks more like natural leather in all aspects such as feeling, touching and other characteristics, than that obtained by using poly-γ-methyl-L-glutamate alone. Intrinsic volume resistivity of the sheet-like article thus obtained is measured to show less than $10^9/\Omega \cdot cm$. (voltage: 100 v.).

Example 2

Properties of the film prepared from a material obtained by thoroughly kneading a 1,2-dichloroethane solution of poly-γ-methyl-L-glutamate (molecular weight: about 350,000) with dibutyl glutamate ester in an amount of 10–52% based on the content of the polymer are as shown in Table 2. (The properties of the poly-γ-methyl-L-glutamate alone are also shown.) The sheet-like article prepared by formation of film on the substrate cloth had properties very closely resembling those of natural leather.

That is, its tensile strength is almost equal to that of the silver surface of natural leather, that is about 120–180 kg./cm.$^2$, and its elongation is found to be about 90–120%, which is almost the same as that of natural leather. The feeling and other characteristics of the sheet-like product thus obtained are very similar to those of natural leather.

Example 3

A film prepared by kneading a 1,2-dichloroethane solution of poly-γ-methyl glutamate (molecular weight: about 350,000) with dibutyl aspartate ester in an amount of 10–52% based on the content of the polymer showed almost the same result as in the film in Example 2 wherein the dibutyl glutamate ester is used. A sheet-like article prepared by formation of this film on the substrate cloth showed feeling and other characteristics closely resembling those of natural leather in like manner as in the case of Example 1.

Example 4

An unwoven fabric substrate consisting of 50% of cotton and 50% of rayon staple is coated with a polyurethane type adhesive so as to form a layer having about 0.02 mm. thickness thereon. When the coated layer is semi-dried, a mixture obtained by thoroughly kneading together 90 parts of poly-γ-butyl-L-glutamate (molecular weight: about 300,000), 10 parts of N,N-dimethylglutamate-di(2-ethylhexyl) ester and 900 parts of tetrachloroethane is coated thereon so as to form a layer of about 0.2 mm. in thickness. The coating is then dried to obtain a synthetic leather resembling natural leather in both tensile strength and elongation.

Example 5

90 parts of poly-γ-benzyl-D-glutamate (molecular weight: about 400,000), 10 parts of benzyl aminomalonate and 1,000 parts of dioxane are thoroughly kneaded together. The resultant mixture is coated in 0.3 mm. thickness on a poly-γ-methyl glutamate fiber substrate cloth on the surface of which a polyurethane type adhesive is previously coated. The resultant coated product is dried to obtain a synthetic leather having properties very closely resembling those of natural leather.

Example 6

A synthetic leather prepared by the same procedure as in the case of Example 1, using a mixture comprising 92 parts of poly-γ-methyl-L-glutamate (molecular weight: about 300,000), 8 parts of dibutyl N-acetylglutamate and 900 parts of 1,2-dichloroethane, showed feeling, touching and other characteristics closely resembling those of natural leather in like manner as in the case of Example 1.

Example 7

A film prepared by the same procedure as in the case of Example 2, using a mixture comprising poly-γ-methyl-L-glutamate (molecular weight: about 400,000) and dibutyl N-acetylglutamate in an amount of 10 to 52% based on the content of the polymer showed almost the same result as in the film in Example 2. A synthetic leather prepared by the same procedure as in the case of Example 2 showed feeling, touching and other characteristics closely resembling those of natural leather.

Example 8

A synthetic leather prepared by the same procedure as in the case of Example 1, using a mixture of 90 parts of poly-γ-methyl-D-glutamate (molecular weight: about 350,000), 10 parts of dibutyl N-acetylaspartate and 900 parts of 1,2-dichloroethane, showed feeling, touching and other characteristics closely resembling those of natural leather in like manner as in the case of Example 1.

Example 9

A synthetic leather prepared by the same procedure as in the case of Example 4, using a mixture of 90 parts of poly-γ-(n-butyl)-L-glutamate (molecular weight: about 250,000), 10 parts of dibutyl N-phenylacetylglutamate and 900 parts of 1,2-dichloroethane, showed feeling, touching and other characteristics closely resembling those of natural leather in like manner as in the case of Example 1.

Example 10

A synthetic leather prepared by the same procedure as in the case of Example 5, using a mixture of 90 parts of γ-benzyl-D-glutamate (molecular weight: about 450,000), 10 parts of N-chloroacetylaminomalonate and 900 parts of dioxane, showed the same result as in that of Example 5.

Example 11

A synthetic leather prepared by the same procedure as in the case of Example 1, using a mixture comprising 90 parts of copolymer (molecular weight: about 200,000) of γ-methyl-L-glutamate and γ-(n-butyl)-L-glutamate (7:3), 10 parts of di(i-propyl) N-acetylglutamate and 900 parts of 1,2-dichloroethane, showed the same result as in that of Example 1.

Example 12

A synthetic leather prepared by the same procedure as in the case of Example 1, using a mixture comprising 92 parts of copolymer (molecular weight: about 250,000) of γ - methyl-D-glutamate, γ-methoxyethyl-D-glutamate and N-acetyl-L-lysine (8:2:1), 8 parts of di(chloroethyl) N-acetylglutamate and 900 parts of tetrachloroethane, showed the same result as in that of Example 1.

Example 13

A synthetic leather prepared by the same procedure as in the case of Example 4, using a mixture of 90 parts of copolymer (molecular weight: about 250,000) of γ-ethyl-L-glutamate, γ-(n-propyl)-L-glutamate and L-alanine (8:1:1), 10 parts of di-(n-propyl) N-acetylaminoadipate and 900 parts of 1,2-dichloroethane, showed the same result as in that of Example 4.

Example 14

A synthetic leather prepared by the same procedure as in the case of Example 1, using a mixture of 92 parts of blend polymer of poly-γ-methyl-L-glutamate (molecular weight: about 400,000) and poly-γ-(t-butyl)-L-glutamate (molecular weight: about 200,000) (8:2), 8 parts of α-methyl-γ-butyl N-acetyl glutamate and 900 parts of 1,2-dichloroethane, showed the same result as in that of Example 1.

Example 15

A synthetic leather prepared by the same procedure as in the case of Example 4, using a mixture of 90 parts of blend polymer of poly-γ-methyl-L-glutamate (molecular weight: about 200,000), poly-L-alanine (molecular weight: 350,000) and poly-γ-benzyl-L-glutamate (molecular weight: 450,000) (9:1:1), 10 parts of dibenzyl α-N-acetylamino-β-acetoxyadipate and 900 parts of 1,2-dichloroethane and dioxane (1:1), showed the same result as in that of Example 4.

Example 16

A synthetic leather prepared by the same procedure as in the case of Example 4, using a mixture of 90 parts of blend polymer of poly-γ-ethyl-D-glutamate (molecular weight: about 300,000) and polyamide polymer of O$^1$,O$^2$-di(γ-glutamyl) ethylene glycol (molecular weight: about 250,000), 10 parts of di(cyclohexyl) N-acetyl-β-methylglutamate and 900 parts of 1,2-dichloroethane, showed the same result as in that of Example 4.

The invention being thus described, it will be obvious that the same may be varied in many ways. Such variations are not to be regarded as a departure from the spirit and scope of the invention, and all such modifications as would be obvious to one skilled in the art as intended to be included herein.

What is claimed is:

1. A synthetic, leather-like coating composition which comprises an admixture consisting of a polymer having a molecular weight of from about 50,000 to about 500,000 and being selected from the group consisting of (1) homopolymer of a glutamic acid γ-ester monomer, (2) copolymer of glutamic acid γ-ester monomer with one or two comonomers selected from other glutamic acid γ-esters and alanine, lysine, methionine and their derivatives and (3) blend polymer of glutamic acid γ-ester polymer and other one or two polymers selected from other glutamic acid γ-ester polymer and polyalanine, polylysine, polymethionine and their derivatives; and an acidic amino acid derivative or mixture thereof represented by the formulas:

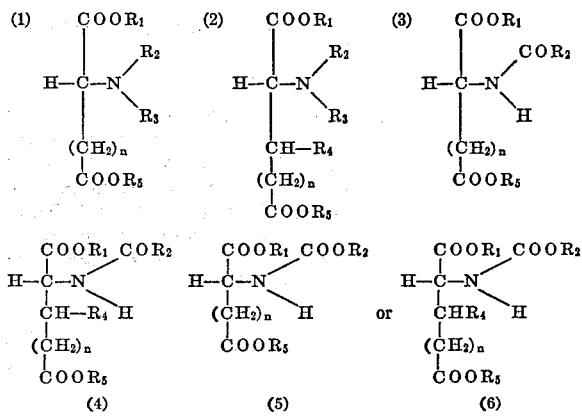

wherein $R_1$ and $R_5$ are the same or different ester residues selected from the group consisting of a saturated or unsaturated aliphatic hydrocarbon residue having 1 to 10 carbon atoms, a saturated or unsaturated cycloaliphatic hydrocarbon residue having 4 to 8 carbon atoms, an aromatic hydrocarbon residue including aryl, alkaryl and aralkyl types having 6 to 10 carbon atoms, and a residue belonging to the above-mentioned types of hydrocarbon residue having a substituent or substituents selected from the group consisting of chloro and bromo; $R_2$ and $R_3$ are the same or different and, respectively, represent hydrogen or a hydrocarbon residue selected from the group consisting of a saturated or unsaturated aliphatic hydrocarbon residue having 1 to 6 carbon atoms, a saturated or unsaturated cycloaliphatic hydrocarbon residue having 4 to 6 carbon atoms, an aromatic hydrocarbon residue including aryl, alkaryl and aralkyl types having 6 to 8 carbon atoms, and a residue belonging to the above-mentioned types of hydrocarbon residues having a substituent or substituents selected from the group consisting of chloro and bromo; $R_4$ represents an OH, an alkoxy or a saturated or unsaturated aliphatic hydrocarbon residue having 1 to 6 carbon atoms; and $n$ is an integer from 0 to 30.

2. The coating composition of claim 1, wherein the glutamic acid γ-ester monomer used to produce said polymer is given in the following formulas:

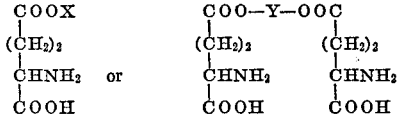

wherein X is a monovalent hydrocarbon group selected from the group consisting of a saturated or unsaturated aliphatic hydrocarbon residue having 1 to 6 carbon atoms, a saturated or unsaturated cycloaliphatic hydrocarbon residue having 4 to 8 carbon atoms, an aromatic hydrocarbon residue having 6 to 10 carbon atoms, including aryl, alkaryl and aralkyl types, and a residue belonging to the above-mentioned types of hydrocarbons having a substituent or substituents selected from the group consisting of chloro and bromo; and Y is a divalent hydrocarbon group selected from the group consisting of a saturated or unsaturated aliphatic hydrocarbon residue having 1 to 6 carbon atoms and a residue belonging to the above-mentioned types of hydrocarbons having a substituent or substituents selected from the group consisting of chloro, bromo, alkoxy and carboalkoxy.

3. The coating composition of claim 1, wherein the acidic amino acid derivative is a member selected from the group consisting of the diesters and mixed esters of amino acids, β-substituted amino acids, N-substituted amino acids, N,N-disubstituted amino acid, β-substituted N-substituted amino acids and β-substituted N,N-disubstituted amino acids wherein the said amino acid is selected from the group consisting of aminomalonic acid, aspartic acid, glutamic acid, α-aminoadipic acid, α-aminopimeric acid, α-aminosuberic acid, and α-aminosebacic acid, the substituent or substituents on the β-position are selected from the group consisting of hydroxy, methoxy, ethoxy, n-propoxy, n-butoxy, i-propoxy, i-butoxy, sec-butoxy, tert-butoxy, methyl, ethyl, n-propyl, i-propyl, n-butyl, i-butyl, sec-butyl, and t-butyl; the substituent or substituents on the N position are selected from the group consisting of formyl, acetyl, propionyl, butyryl, valeryl, dodecanoyl (lauroyl), palmitoyl, stearoyl, benzoyl, phenylacetyl, carbobenzoxy (benzyloxycarbonyl), chloroacetyl, dichloroacetyl, trichloroacetyl, carbocyclohexyloxy (cyclohexyloxycarbonyl), carbo-tert-butyloxy (tert-butyloxycarbonyl), methyl, ethyl, n-propyl and isomers thereof, n-butyl and isomers thereof, n-pentyl and isomers thereof, n-hexyl and isomers thereof, n-octyl and isomers thereof, n-decyl and isomers thereof, n-dodecyl and isomers thereof, hexadecyl (cetyl), stearyl, oleyl, cyclobutyl, cyclopentyl, cyclohexyl, cycloheptyl, cyclooctyl, cyclobutylmethyl, cyclopentylmethyl, cyclohexylmethyl, phenyl, benzyl, o-tolyl, β-phenylethyl, p-tolylmethyl, p-chlorobenzyl, p-nitrobenzyl, p-cyanobenzyl, p-methoxybenzyl, p-ethoxybenzyl, pentachlorobenzyl, p-chlorophenyl, pentachlorophenyl, p-nitrophenyl, p-methoxyphenyl, p-ethoxyphenyl, o-(2-chlorotolyl), methoxymethyl, ethoxymethyl, 2-hydroxyethyl, 2-nitroethyl, 2-cyanoethyl, 2-methoxyethyl, 2-bromoethyl, 1,2-dichloropropyl, 2,3 - dichloropropyl, 2 - chloropropyl, 3 - chloropropyl, 2-chloroethyl, vinyl, crotyl, and allyl; and the ester groups are the same or different members selected from the group consisting of methyl, ethyl, n-propyl, i-propyl, n-butyl and isomers thereof, n-pentyl and isomers thereof, n-hexyl and isomers thereof, n-heptyl and isomers thereof, cyclobutyl, cyclopentyl, cyclohexyl, cycloheptyl, cyclooctyl, phenyl, o-tolyl, p-tolyl, benzyl, β-phenylethyl, p-tolylmethyl, o-tolylmethyl, o-(2-chlorotolyl), methoxymethyl, ethoxymethyl, 2 - chloroethyl, 2 - bromoethyl, 2-chloropropyl, 3-chloropropyl.

4. The coating composition of claim 1, wherein the said acidic amino acid derivative is present in an amount varying from about 5 up to about 60% by weight of the polymer.

5. The coating composition of claim 2, wherein the X is selected from the group consisting of methyl, ethyl, n-propyl, i-propyl, n-butyl and isomers thereof, n-pentyl and isomers thereof, n-hexyl and isomers thereof, n-heptyl and isomers thereof, n-octyl and isomers thereof, n-decyl and isomers thereof, n-dodecyl (lauryl) and isomers thereof, cetyl, stearyl, oleyl, cyclobutyl, cyclopentyl, cyclohexyl, cycloheptyl, cyclooctyl, cyclobutylmethyl, cyclopentylmethyl, cyclohexylmethyl, methylcyclohexyl, phenyl, o-tolyl, p-tolyl, benzyl, β-phenylethyl, p-tolylmethyl, o-tolylmethyl, o-(2-chlorotolyl), methoxymethyl, ethoxymethyl, 2-nitroethyl, 2-chloroethyl, 2-bromoethyl, 2-chloropropyl, 3-chloropropyl, 1,2-dichloropropyl, 2,3-dichloropropyl, 3-bromopropyl, vinyl, allyl, crotyl, p-chlorobenzyl, p-bromobenzyl, p-methoxybenzyl, o-carboethoxybenzyl, p-carboethoxybenzyl, o- and p-carbomethoxybenzyl, pentachlorobenzyl, o-methoxybenzyl, p-ethoxybenzyl, p-methoxyphenyl, p-ethoxyphenyl, p-chlorophenyl, pentachlorophenyl, p-carbomethoxyphenyl, β-(carboethoxyethyl), 2-methoxyethyl, 2-ethoxyethyl, 3-methoxypropyl, 3-ethoxypropyl, 3-butoxypropyl, 4-methoxybutyl, 4-ethoxybutyl, 2-butoxyethyl, and Y is selected from the group consisting of ethylene, propylene, trimethylene, tetramethylene, pentamethylene, hexamethylene, 2-butenylene, cyclopentylene, cyclohexylene, cyclohexenylene, p-phenylene and residues derived from p-di(hydroxymethyl)benzene, p-di(hydroxymethyl)cyclohexane, diethylene glycol and dipropylene glycol.

6. The coating composition of claim 1, wherein the acidic amino acid derivative is present with the polymer in an amount, based on the amount of the polymer, effective to impart to said coating the properties of natural leather.

7. The coating composition of claim 1 wherein the acidic amino acid derivative is present in an amount up to about 52%, based on the amount of the polymer present.

8. The coating composition of claim 1, wherein the acidic amino acid derivative is present in an amount of about 8 to 52% based on the amount of the polymer present.

9. The coating composition of claim 1, consisting of 92 parts of poly-γ-methyl-L-glutamate and 8 parts of dibutyl glutamate ester.

10. The coating composition of claim 1, consisting of poly-γ-methylglutamate and up to about 52% of dibutyl aspartate ester, based on the amount of polymer present.

11. The coating composition of claim 1, consisting of poly-γ-methyl-L-glutamate and about 10% dibutylglutamate, based on the amount of polymer present.

12. The coating composition of claim 1, consisting of 90 parts of poly-γ-butyl-L-glutamate and 10 parts of N,N-dimethylglutamate-di(2-ethylhexyl) ester.

13. The coating composition of claim 1, consisting of 90 parts of poly-γ-benzyl-D-glutamate and 10 parts of benzyl aminomalonate.

14. The coating composition of claim 1, consisting of 92 parts of poly-γ-methyl-L-glutamate and 8 parts of dibutyl N-acetylglutamate.

15. The coating composition of claim 14, consisting of up to 52% of the dibutyl N-acetylglutamate, based on the amount of the polymer.

16. The coating composition of claim 1, consisting of 90 parts of polq-γ-methyl-D-glutamate and 10 parts of dibutyl N-acetylaspartate.

17. The coating composition of claim 1, consisting of 90 parts of poly-γ-(n-butyl)-L-glutamate and 10 parts of dibutyl N-phenylacetylglutamate.

18. The coating composition of claim 1, consisting of 90 parts of γ-benzyl-D-glutamate and 10 parts of N-chloroacetylaminomalonate.

19. The coating composition of claim 1, consisting of 90 parts of a copolymer of γ-methyl-L-glutamate and γ-(n-butyl)-L-gutamate in a ratio of 7:3 and 10 parts of di(i-propyl) N-acetylglutamate.

20. The coating composition of claim 1, consisting of 92 parts of a copolymer of γ-methyl-D-glutamate, γ-methoxyethyl-D-glutamate and N-acetyl-L-lysine, in a ratio of 8:2:1 and 8 parts of di(chloroethyl) N-acetylglutamate.

21. The coating composition of claim 1, consisting of 90 parts of a copolymer of γ-ethyl-L-glutamate, γ-(n-propyl)-L-glutamate and L-alanine in a ratio of 8:1:1 and 10 parts of di(n-propyl) N-acetylaminoadipate.

22. The coating composition of claim 1, consisting of 92 parts of a blend of poly-γ-methyl-L-glutamate and poly-γ-(t-butyl)-L-glutamate in a ratio of 8:2 and 8 parts of α-methyl-γ-butyl N-acetylglutamate.

23. The coating composition of claim 1, consisting of 90 parts of a blend of poly-γ-methyl-L-glutamate, poly-L-alanine and poly-γ-benzyl-L-glutamate, in a ratio of 9:1:1 and 10 parts of dibenzyl α-N-acetylamino-β-acetoxyadipate.

24. The coating composition of claim 1, consisting of 90 parts of a blend of poly-γ-ethyl-D-glutamate, and polyamide polymer of $O^1,O^2$-di(γ-glutamyl)ethylene glycol and 10 parts of di(cyclohexyl) N-acetyl-β-methylglutamate.

25. The coating composition of claim 1, wherein the acidic amino acid derivative is present in an amount sufficient to impart to the coating composition the tensile strength, elongation, antistatic power, and reduction in dust adsorption properties of natural leather.

26. The coating composition of claim 1, wherein the tensile strength is about 90 to 180 kg./cm.$^2$ and the elongation is about 110 to 120%.

27. The coating composition of claim 1, wherein said polymer is an organic solvent solution.

28. The coating composition of claim 1, wherein the acidic amino acid derivative is a member selected from the group consisting of the diesters and mixed esters of N-substituted amino acids wherein the said amino acid is selected from the group consisting of aminomalonic acid, aspartic acid, glutamic acid, α-aminoadipic acid, α-aminopimeric acid, α-aminosuberic acid and α-aminosebacic acid; the substituent on the N position is selected from the group consisting of formyl, acetyl, propionyl, butyryl, valeryl, dodecanoyl, palmitoyl, stearoyl, benzoyl, phenylacetyl, carbobenzoxy, chloroacetyl, dichloroacetyl, trichloroacetyl, carbocyclohexyloxy, carbo-tert-butyloxy; and the ester group are the same or different member selected from the group consisting of methyl, ethyl, n-propyl, i-propyl, n-butyl and isomers thereof, n-pentyl and isomers thereof n-hexyl and isomers thereof, n-heptyl and isomers thereof, cyclobutyl, cyclopentyl, cyclohexyl, cycloheptyl, cyclooctyl, phenyl, o-tolyl, p-tolyl, benzyl, β-phenylethyl, p-tolylmethyl, o-tolylmethyl, o-(2-chlorotolyl), methoxymethyl, ethoxymethyl, 2-chloroethyl, 2-bromoethyl, 2-chloropropyl, 3-chloropropyl.

29. The coating composition of claim 1, wherein said polymer having a molecular weight of from about 50,000 to about 500,000 is a homopolymer of a glutamic acid γ-ester monomer.

30. The coating composition of claim 1, wherein the polymer having a molecular weight of from about 50,000 to about 500,000 is a copolymer of glutamic acid γ-ester monomer with one or two comonomers selected from other glutamic acid γ-esters and alanine, lysine, methionine and their derivatives.

31. The coating composition of claim 1, wherein the polymer having a molecular weight of from about 50,000 to about 500,000 is a blend polymer of glutamic acid γ-ester polymer and other one or two polymers selected from other glutamic acid γ-ester polymer and polyalanine, polysine and polymethionine and their derivatives.

References Cited
UNITED STATES PATENTS

| | | | |
|---|---|---|---|
| 3,230,274 | 1/1966 | Garber et al. | 260—78 A X |
| 3,369,026 | 2/1968 | Iwatsuki et al. | 260—78 A X |
| 3,719,520 | 3/1973 | Fujimoto et al. | 260—78 A X |
| 3,371,069 | 2/1968 | Miyamae et al. | 260—78 A |

HOWARD E. SCHAIN, Primary Examiner

U.S. Cl. X.R.

260—30.4 N, 33.8 R, 78 A